April 28, 1970     I. R. LAMPORT     3,508,801

NEEDLE THRUST BEARING

Filed Nov. 8, 1968

INVENTORS
IVAN R. LAMPORT

BY

ATTORNEYS

United States Patent Office 3,508,801
Patented Apr. 28, 1970

3,508,801
NEEDLE THRUST BEARING
Ivan R. Lamport, East Peoria, Ill., assignor to Caterpillar Tractor Co., Peoria, Ill., a corporation of California
Filed Nov. 8, 1968, Ser. No. 774,458
Int. Cl. F16c 19/30
U.S. Cl. 308—231　　　　　　　　　　　　　2 Claims

ABSTRACT OF THE DISCLOSURE

A thrust bearing of the needle type for use where one of the bearing races is backed up by a ring which tends to distort it and a contoured annular member between the ring and the race to distribute the thrust load uniformly across the width of the race and throughout the length of the needles.

---

Figure 1:
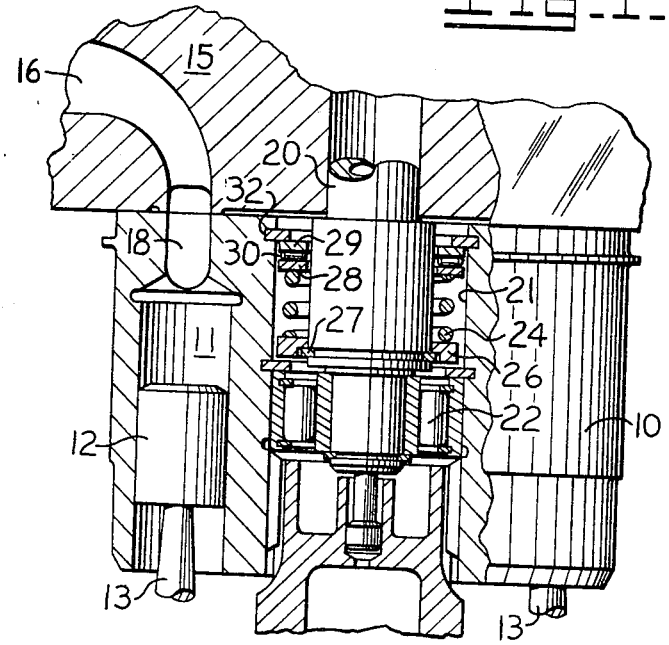

In the environment of some thrust bearings, for example, one which is employed in a hydrostatic pump or motor, a spring is located in a cylindrical bore between a stub shaft in the bore and the inner wall of the bore. The spring is compressed between snap rings, one on the shaft and the other in the bore, and a thrust bearing is employed between one snap ring and the spring. Heavy loads sustained in this environment distorts the snap ring and also the bearing race which abuts it. This causes uneven bearing loading and consequent rapid wear and bearing failure.

Figure 2:
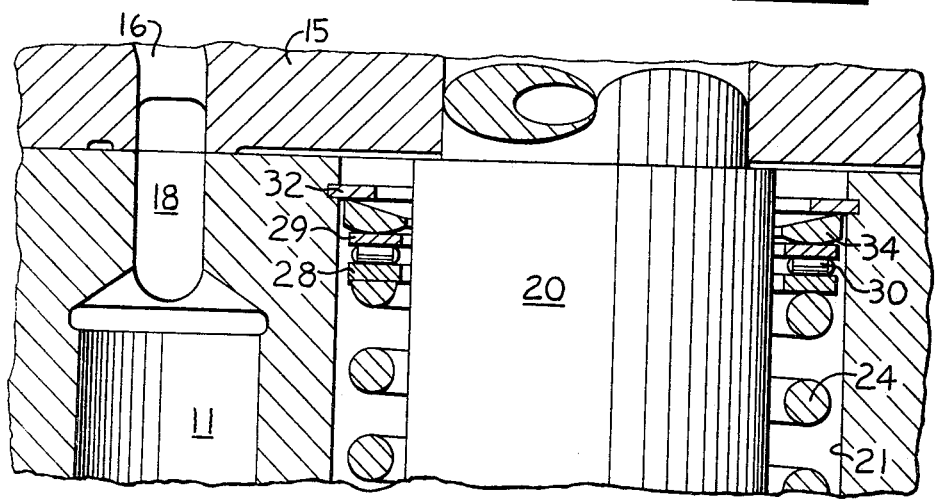

It is the object of the present invention to avoid such distortion and bearing failure and the construction and advantages of the invention will be best understood from the following description wherein reference is made to the accompanying drawing:

In the drawing:

FIG. 1 is a fragmentary sectional view showing the cylinder barrel of a hydrostatic pump or motor and some associated parts; and FIG. 2 is an enlarged fragmentary view of a part of the structure shown in FIG. 1 illustrating the present invention.

The thrust bearing construction is illustrated herein in the environment of a hydrostatic motor, a part of which is shown in FIG. 1 as having a rotatable cylinder barrel 10 which has a plurality of cylinders 11 in which pistons 12 reciprocate. The pistons have rods 13 which ride on a surface inclined with respect to the cylinder barrel in a well-known manner. The upper-end of the barrel abuts a valve head 15 with passages therein, one of which is shown at 16, serving as intake and exhaust passages for fluid which is being pumped or which is driving a motor, as the case may be, and these passages are opened and closed in timed relationship by the movement of passages 18 in the cylinder barrel which communicate with the cylinders 11 and intermittently with the passages in the valve head 15. A stub shaft or spindle 20 extends downwardly from the valve head and into a central bore 21 of the cylinder barrel. A roller bearing 22 is disposed between the bore and the spindle to permit rotation of the barrel 10.

To prevent leakage of fluid under high pressure, to and from the cylinders 11 between the relatively rotating surfaces of the barrel and the valve head, a spring 24 urges the barrel upwardly into very close contact with the valve head. The spring is seated at its lower end on a seat 26 which bears downwardly on a snap ring 27 engaged in a groove in the periphery of the spindle 20. The upper end of the spring rests against a thrust bearing made up, as best illustrated in FIG. 2, of a lower bearing race 28, an upward bearing race 29 and intermediate needle bearings 30. In FIG. 1, which shows a prior art structure, the upper bearing race 29 bears against a snap ring 32 in a groove in the wall of the bore 21.

It was the slight flexing of the snap ring 32 and consequent distortion of the upper bearing race 29 which caused uneven loading of the needle bearings toward the outboard edge of their length and caused rapid wear due to load concentration.

In accordance with the present invention, a load ring shown at 34 in FIG. 2 is disposed between the snap ring 32 and the upper bearing race 29. This load ring has a contoured or convex surface in contact with the upper bearing race centrally of its width and the upper side of the load ring converges downwardly and inwardly so that only its outer edge bears against the snap ring 32 so that the effect of slight distortion of the snap ring 32 and the contoured load ring 34 is compensated for by slight rotation of the convex surface. Therefore, the contact between the convex side of the load ring and the bearing race remains essentially in its centrally disposed position so that the load on the bearings is substantially equally distributed throughout their length, bearing wear is greatly reduced, and bearing life is increased considerably.

What is claimed is:

1. In a needle thrust bearing having two flat annular bearing races and needle bearings disposed between them, and an annular reaction member overlying one of said races and subject to deflection from axial forces acting on the bearing, the improvement which comprises a load ring disposed between the reaction member and the said one race, and having a convex surface in contact with the race on a line substantially centrally of its width.

2. The improvement of claim 1 in which the reaction member is disposed in a groove in an annular wall adjacent the bearing, and the load ring is shaped to contact the reaction member on a line close to the wall to minimize deflection of the reaction member.

References Cited

UNITED STATES PATENTS 2,246,588　6/1941　Harrall _____ 308—231

MARTIN P. SCHWADRON, Primary Examiner
FRANK SUSKO, Assistant Examiner